(12) United States Patent
Bartlett et al.

(10) Patent No.: US 9,348,716 B2
(45) Date of Patent: May 24, 2016

(54) RESTORING REDUNDANCY IN A STORAGE GROUP WHEN A STORAGE DEVICE IN THE STORAGE GROUP FAILS

(71) Applicant: International Business Machines Corporation, Armonk, NY (US)

(72) Inventors: Eric J. Bartlett, Winchester (GB); Matthew J. Fairhurst, Winchester (GB)

(73) Assignee: International Business Machines Corporation, Armonk, NY (US)

(*) Notice: Subject to any disclaimer, the term of this patent is extended or adjusted under 35 U.S.C. 154(b) by 155 days.

(21) Appl. No.: 13/912,153

(22) Filed: Jun. 6, 2013

(65) Prior Publication Data
US 2013/0346794 A1    Dec. 26, 2013

(30) Foreign Application Priority Data
Jun. 22, 2012    (GB) .............................. GB1211041.7

(51) Int. Cl.
| G06F 11/00 | (2006.01) |
| G06F 11/20 | (2006.01) |
| G06F 12/08 | (2016.01) |
| G06F 11/10 | (2006.01) |

(52) U.S. Cl.
CPC ........ *G06F 11/2094* (2013.01); *G06F 11/1076* (2013.01); *G06F 11/2092* (2013.01); *G06F 12/0888* (2013.01)

(58) Field of Classification Search
CPC . G06F 12/0866; G06F 12/16; G06F 11/2092; G06F 3/067
USPC ............ 711/162, 111, 119, 124; 714/5.11, 11
See application file for complete search history.

(56) References Cited

U.S. PATENT DOCUMENTS

| 6,321,298 | B1 * | 11/2001 | Hubis ........................... 711/124 |
| 6,412,045 | B1 * | 6/2002 | DeKoning et al. ............ 711/135 |
| 6,567,889 | B1 * | 5/2003 | DeKoning et al. ............ 711/114 |
| 7,146,465 | B2 | 12/2006 | Korgaonkar |

(Continued)

FOREIGN PATENT DOCUMENTS

JP          2002297322         10/2002

OTHER PUBLICATIONS

Machine Translation for JP2002297322, published Oct. 11, 2002, pp. 1-24.

(Continued)

*Primary Examiner* — Bryce Bonzo
*Assistant Examiner* — Jeison C Arcos
(74) *Attorney, Agent, or Firm* — David W. Victor; Konrad, Raynes, Davda and Victor LLP

(57) ABSTRACT

Provided are a system, computer program, and method for restoring redundancy in a storage group when a storage device in the storage group fails. In response to detecting a failure of a first storage device in a storage group, wherein the storage group stores each of a plurality of extents in the first storage device and a second storage device to provide redundancy, a determination is made whether a spare storage device that has a storage capacity less than that of the storage group. One of the extents in a storage location in the second storage device that is beyond an upper limit of positions in the spare storage device is moved to a new storage location. The spare drive is incorporated into the storage group to provide redundant storage for the storage group, wherein the extents in the storage group are copied to the spare drive.

17 Claims, 8 Drawing Sheets

(56) References Cited

U.S. PATENT DOCUMENTS

| | | | |
|---|---|---|---|
| 7,424,637 B1* | 9/2008 | Schoenthal | G06F 3/0607 711/161 |
| 7,434,090 B2 | 10/2008 | Hartung et al. | |
| 8,099,623 B1 | 1/2012 | Li et al. | |
| 2002/0087785 A1* | 7/2002 | Milligan | G06F 11/1076 711/112 |
| 2002/0133735 A1* | 9/2002 | McKean et al. | 714/5 |
| 2002/0174296 A1 | 11/2002 | Ulrich et al. | |
| 2003/0051098 A1* | 3/2003 | Brant et al. | 711/114 |
| 2005/0193273 A1 | 9/2005 | Burkey | |
| 2005/0210322 A1 | 9/2005 | Corrado | |
| 2007/0220313 A1* | 9/2007 | Katsuragi et al. | 714/6 |
| 2008/0005614 A1* | 1/2008 | Lubbers et al. | 714/11 |
| 2008/0016301 A1* | 1/2008 | Chen | 711/162 |
| 2008/0109601 A1 | 5/2008 | Klemm et al. | |
| 2008/0201392 A1* | 8/2008 | Nakajima | G06F 11/108 |
| 2009/0204636 A1* | 8/2009 | Li | G06F 17/3015 |
| 2009/0319724 A1* | 12/2009 | Oe et al. | 711/113 |
| 2010/0030960 A1 | 2/2010 | Kamalavannan et al. | |
| 2014/0229676 A1* | 8/2014 | Biswas et al. | 711/119 |

OTHER PUBLICATIONS

British Search Report, dated Oct. 1, 2012, for International Application No. GB1211041.7, pp. 1-3, Winchester, GB.

Search Report, Intellectual Property Office, dated Oct. 1, 2010, for JP2002297322, 1pp.

* cited by examiner

RESTORING REDUNDANCY IN A STORAGE GROUP WHEN A STORAGE DEVICE IN THE STORAGE GROUP FAILS

CROSS-REFERENCE TO RELATED FOREIGN APPLICATION

This application is a non-provisional application that claims priority benefits under Title 35, United States Code, Section 119(a)-(d) from United Kingdom Patent Application entitled "AN APPARATUS FOR RESTORING REDUNDANCY" by Matthew J. FAIRHURST and Eric J. BARTLETT, having United Kingdom Patent Application Serial No. GB1211041.7, filed on Jun. 22, 2012, which United Kingdom Patent Application is incorporated herein by reference in its entirety.

FIELD OF THE INVENTION

Provided are a system, computer program, and method for restoring redundancy in a storage group when a storage device in the storage group fails.

BACKGROUND OF THE INVENTION

RAID systems store and access multiple, heterogeneous individual hard drives as if the array were a single, larger disk. Distributing data over these multiple disks reduces the risk of losing the data if one drive fails and it also improves access time. RAID was developed for use in transaction or applications servers and large file servers. Currently, RAID is also utilized in desktop or workstation systems where high transfer rates are needed.

Systems today are often sold with a small number of drive types, typically with different performance characteristics (e.g., HDD & SSD). Over time, drive technology changes and different capacities of drives become available. For these or other reasons, clients may end up with a variety of drive capacities—for example a mixture of 300 GB and 600 GB drives.

Most RAID algorithms require that drives in the same array share the same capacity. This means that if, in the example, a 600 GB drive fails, then a 300 GB drive cannot be used as a "hot spare" drive (wherein a hot spare drive can be used to restore redundancy in the event of a drive failure) because its capacity is too small.

A first solution to this problem is to maintain separate pools of 300 GB and 600 GB spare drives. The drawback to this solution is that more spare drives may be required due to different capacities than would be required from a coverage plan based purely on reliability. For example, 300 GB spares cannot be used once all 600 GB spare drives are used up if a 600 GB drive fails.

A second solution to this problem is to provision purely 600 GB spare drives that can cover both array sizes. The drawback to this solution is that space is wasted when a 600 GB spare drive replaces a 300 GB drive. Further, a 600 GB spare drive is typically the most expensive (fastest and largest) type of drive in the system. US 20080109601 discloses systems and methods for RAID Restriping. One method includes selecting an initial RAID device for migration based on at least one score, creating an alternate RAID device, moving data from the initial RAID device to the alternate RAID device, and removing the initial RAID device.

SUMMARY

Provided are a system, computer program, and method for restoring redundancy in a storage group when a storage device in the storage group fails. In response to detecting a failure of a first storage device in a storage group, wherein the storage group stores each of a plurality of extents in the first storage device and a second storage device to provide redundancy, a determination is made whether a spare storage device that has a storage capacity less than that of the storage group. One of the extents in a storage location in the second storage device that is beyond an upper limit of positions in the spare storage device is moved to a new storage location. The spare drive is incorporated into the storage group to provide redundant storage for the storage group, wherein the extents in the storage group are copied to the spare drive.

DETAILED DESCRIPTION

Figure 1:
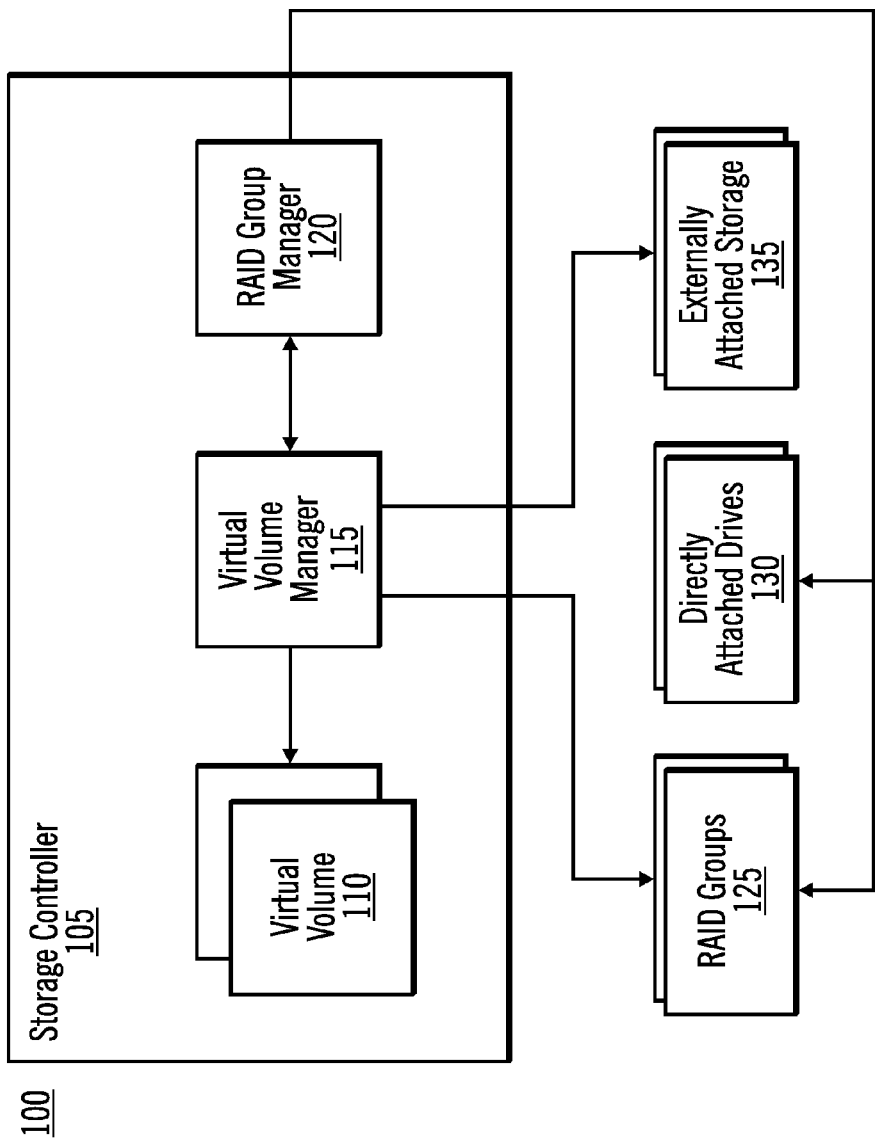
FIG. 1 depicts a representation of a prior art storage virtualisation system.

According to a first aspect, there is provided an apparatus for restoring redundancy in a system having data comprising one or more extents storable in a plurality of RAID drives associated with a group; wherein the data has redundancy across the group, the apparatus comprising: a failure monitor, responsive to detection of a failure of a RAID drive and responsive to a determination that a spare drive does not have a capacity that is greater than or equal to the group's capacity, operable to determine whether there are available extents associated with at least one of: a functional RAID drive associated with the group; a RAID drive associated with another group and a non-RAID drive; and a virtual volume migrator, responsive to a determination that there are available extents; operable to migrate an extent occupying space associated with the functional RAID drive associated with the group having a position that is higher than an upper limit of the spare drive to an available extent, such that a spare drive having a capacity that is not greater than or equal to the group's capacity can be used to replace the failed drive; wherein an available extent associated with the functional RAID drive associated with the group, has a position that is lower than the upper limit of the spare drive.

According to a second aspect, there is provided a method for restoring redundancy in a system having data comprising one or more extents storeable in a plurality of RAID drives associated with a group; wherein the data has redundancy across the group, the method comprising the steps of: determining, in response to detection of a failure of a RAID drive and in response to a determination that a spare drive does not have a capacity that is greater than or equal to the group's capacity, whether there are available extents associated with at least one of: a functional RAID drive associated with the group; a RAID drive associated with another group and a non-RAID drive; and migrating, in response to a determination that there are available extents; an extent occupying space associated with the functional RAID drive associated with the group having a position that is higher than an upper limit of the spare drive to an available extent, such that a spare drive having a capacity that is not greater than or equal to the group's capacity can be used to replace the failed drive;

wherein an available extent associated with the functional RAID drive associated with the group, has a position that is lower than the upper limit of the spare drive.

According to a third aspect, there is provided a computer program comprising program code means adapted to perform all the steps of the method above when said program is run on a computer.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fibre, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fibre cable, RF, etc., or any suitable combination of the foregoing.

Computer program code for carrying out operations for aspects of the present invention may be written in any combination of one or more programming languages, including an object oriented programming language such as Java (Java and all Java-based trademarks and logos are trademarks or registered trademarks of Oracle and/or its affiliates), Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Referring to FIG. 1, there is shown a prior art storage virtualisation system 100 comprising a storage controller 105 which provides virtualisation services and presents one or more virtual volumes 110 to a user by combining extents (wherein contiguous blocks are grouped into one or more sets—when the sets are concatenated to create a single logical virtual volume, such sets are termed extents). Typically, a virtual volume uses capacity (extents) from multiple sources and a user is unaware of the multiple sources.

Such sources are shown in FIG. 1 comprise a first set of directly attached (e.g., storage systems managed by a RAID group manager 120 which is operable to control access to RAID groups 125 and recover from drive failures) drives 125 that are arranged into one or more RAID groups wherein each drive in the same RAID group has the same capacity and each RAID group's usable capacity is split into extents of equal size. As drives come in various capacities, if a RAID group comprises members having different capacities, the lowest capacity of the group is used for each of the drives in the group (termed herein, a RAID group's member capacity). This can result in space associated with the larger drives of the RAID group being wasted.

A further source is depicted in FIG. 1 and comprises a second set of directly attached drives 130 that are assigned as spare drives—it should be understood that RAID groups store data redundantly on a plurality of drives so that the data can be read back even if some of the drives fail. In an example where the same data is stored ("mirrored") to two drives (RAID-1 mirroring), if either drive fails, the data can be read from the other drive. A spare drive is a drive that is not part of a RAID group. When a drive in a RAID group fails, in a hot spare takeover process, the RAID group manager 120 automatically uses a spare drive to take the place of the failed drive. Typically, the functional drive and the failed drive have identical contents. The RAID group manager 120 makes a decision that a particular spare drive should replace the failed drive—this is a logical replacement meaning that reads and writes are sent to each of the functional drive and the spare drive instead of each of the functional drive and the failed drive. Subsequently, the RAID group has to be resynchronized ("rebuilt") by copying the data from the functional drive to the spare drive in order to re-establish the mirror; during this time the RAID group manager (120) is responsible for making sure that reads to the RAID group do not use uncopied areas of the spare drive.

The use of a spare drive allows for a time period in which a RAID group does not have redundancy to be minimized.

It should be understood that a spare drive can only be used by a RAID group if the spare drive's capacity is as least as large as the RAID group's member capacity.

A further source is depicted in FIG. 1 and comprises externally attached storage systems 135 (e.g., storage systems that are not managed by the RAID group manager 120 but that present storage to the system 100 using e.g., a fibre-channel SAN and provide extents to the system 100.

A virtual volume 110 has no particular affinity to particular RAID groups, spare drives and/or externally attached storage systems.

A virtual volume manager 115 is operable to define which extents from which particular RAID groups and/or externally attached storage systems are associated with extents on particular virtual volumes 110. The virtual volume manager 115 executes this process by, for each virtual volume 110 defined by a user of the system, holding a table recording, for each extent of a virtual volume, a current location of the extent. The location of the extent comprises either an identity of a RAID group and a location of the extent on the RAID group; or an identity of an externally attached storage system and a location of the extent on the externally attached storage system.

The system 100 typically comprises unused extents that the virtual volume manager 115 is e.g., operable to assign to further virtual volumes 110 and use for other purposes such as, for storing system configuration data.

Figure 2:
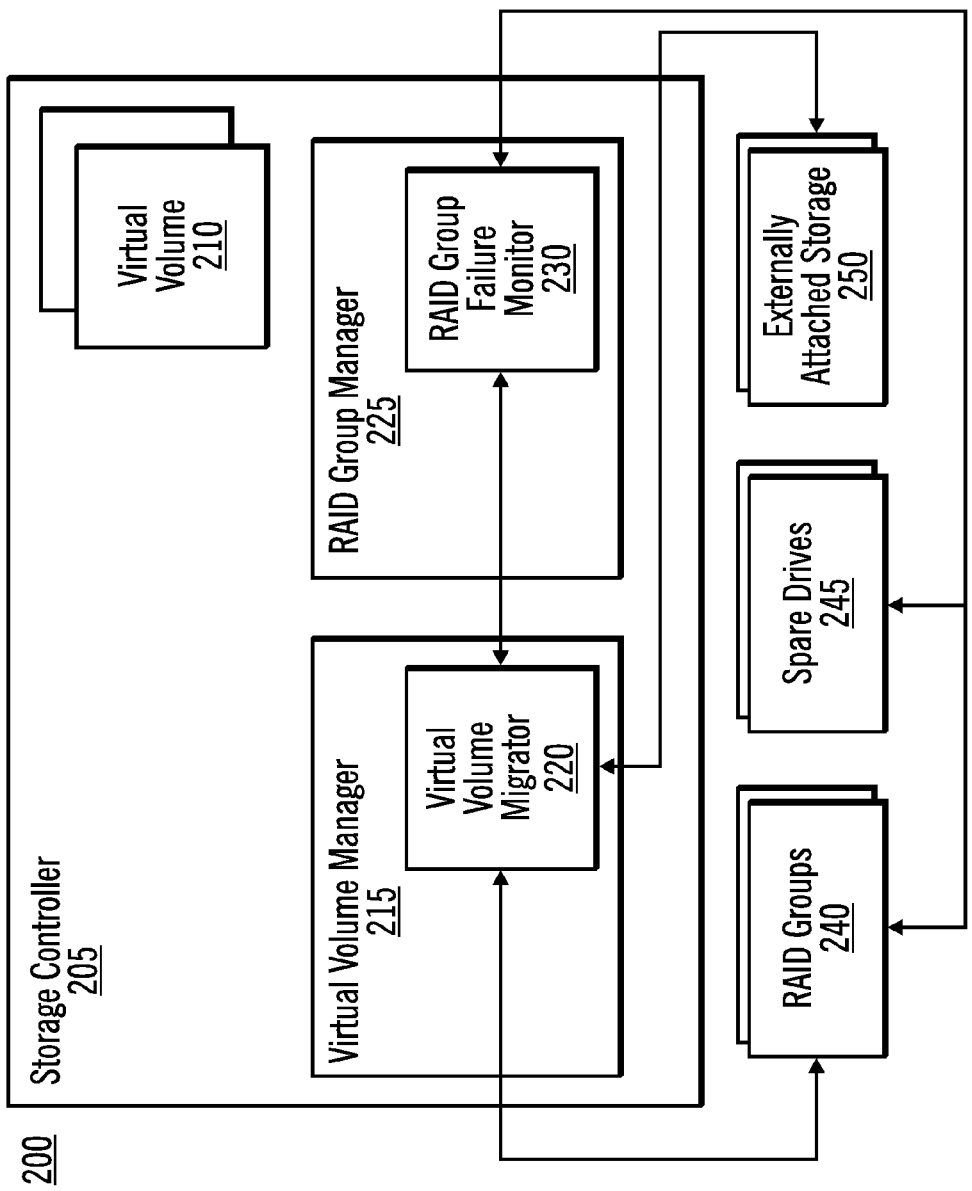
FIG. 2 depicts a representation of a modified storage virtualisation system according to the preferred embodiment.

Referring to FIG. 2, there is shown a modified storage virtualisation system 200 of the system 100 shown in FIG. 1 according to a preferred embodiment. The system 200 comprises a storage controller 205 that presents one or more virtual volumes 210. The storage controller 205 further comprises a virtual volume manager 215 having a virtual volume migrator 220 and a RAID group manager 225 having a RAID group member failure monitor 230.

The system 200 is operable to access one or more RAID groups 240; one or more spare drives 245 and one or more externally attached storage systems (250).

A process of the preferred embodiment will now be described with reference to the figures.

Figure 7A:
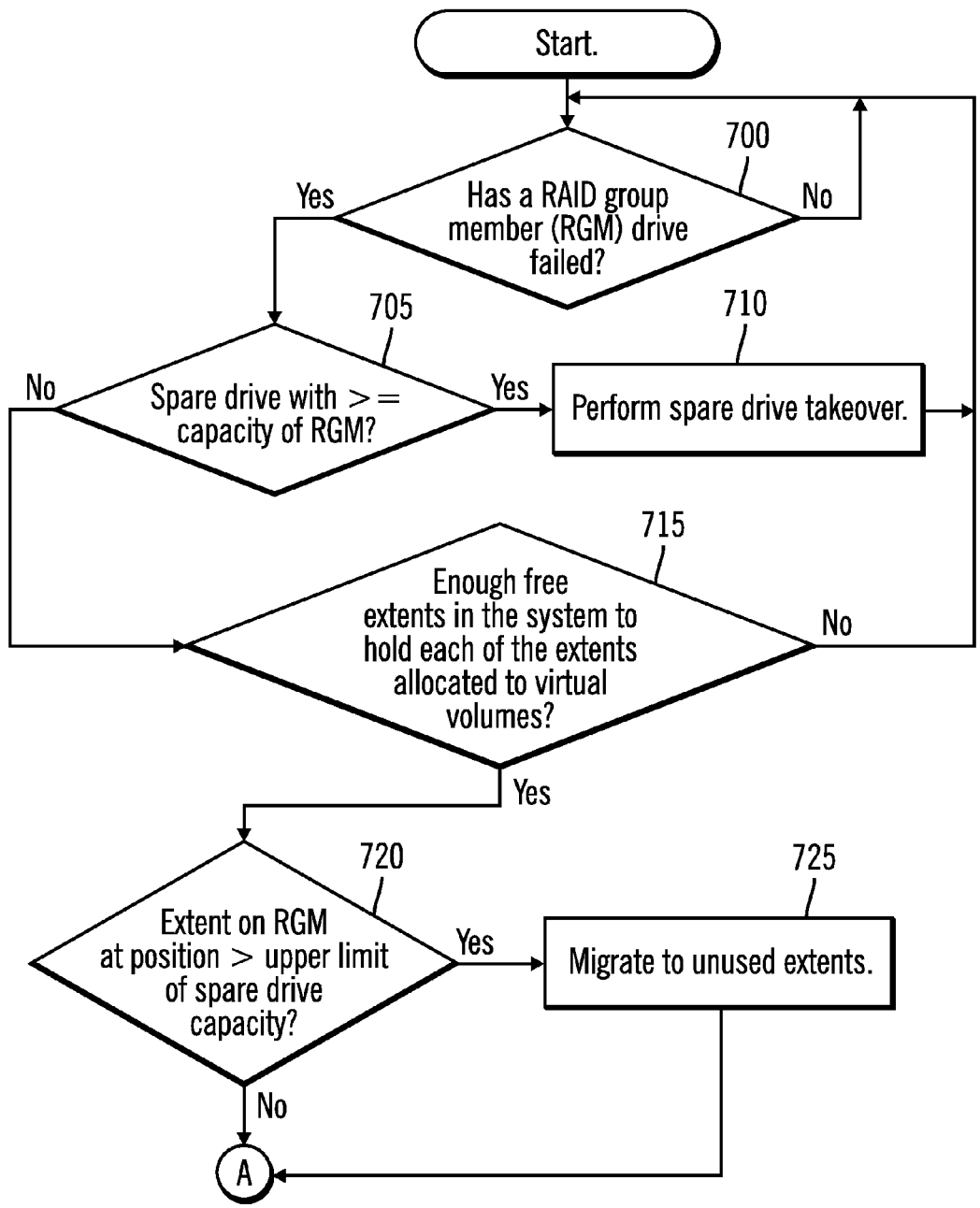
FIGS. 7*a* and 7*b* are flow charts showing the operational steps involved in a process according to the preferred embodiment.

With reference to FIG. 7a, at step 700, the RAID group member failure monitor 230 makes a determination as to whether a member (a drive) of a RAID group 240 has failed. For example, the RAID group member failure monitor 230 detects a failure by issuing a read or write command to a drive and the drive subsequently responds by indicating that it has failed or by detecting that a drive is no longer responding to commands.

If the RAID group member failure monitor 230 makes a determination that a member of a RAID group 240 has not failed, nothing further is done and the process passes back to step 700.

If the RAID group member failure monitor 230 makes a determination that a member of a RAID group 240 has failed, the process passes to step 705 where the RAID group member failure monitor 230 makes a determination as to whether any of the spare drives 245 has a capacity that is greater than or equal to the associated RAID group's member capacity. The RAID group member failure monitor 230 makes the determination by keeping in memory, the capacity of each spare drive and comparing the numeric capacities with the RAID group's member capacity.

In response to a determination that a spare drive 245 has a capacity that is greater than or equal to the RAID group's member capacity, the RAID group manager 225 executes (at step 710) a hot spare takeover process and the process passes back to step 700.

In response to a determination that a spare drive 245 does not have a capacity that is greater than or equal to the RAID group's member capacity the process passes to step 715 where the RAID group member failure monitor 230 makes a determination, using arithmetic operations, as to whether the RAID group's member capacity is less than the capacity of the spare drive 245, and if so whether there are enough free extents in the system 200 to hold each of the extents currently allocated to the one or more virtual volumes 210. Further, before migrating extents, the RAID group member failure monitor 230 may need to ensure that there are enough free extents associated with the system's 200 RAID groups 240 and externally attached storage systems 250 to store the extents currently allocated to the one or more virtual volumes 210. Step 715 will be described in more detail with reference to the examples below.

If the RAID group member failure monitor 230 makes a determination that at least one of: a spare drive 245 does not have a capacity greater than the RAID group's member capacity and that if the RAID group's member capacity were to greater than the spare drive 245 and there are not enough free extents in the system 200, nothing further is done and the process passes back to step 700. In this case, the system 200 is vulnerable until an adequate replacement drive is found.

If the RAID group member failure monitor 230 makes a determination that if the RAID group's member capacity is greater than the capacity of the spare drive 245 and there are enough free extents in the system 200, then the process passes to step 720 where the virtual volume migrator 220 determines whether there are one or more extents occupying space associated with the remaining functional drives in the same RAID group as that of the failed drive that are at a position that is higher than the upper limit of the spare drive.

If the virtual volume migrator 220 makes a determination that there are one or more extents having a position higher than the upper limit of the spare drive, at step 725, the virtual volume migrator 220 migrates the one or more extents to otherwise unused extents in the system 200. For example, the virtual volume migrator 220 reads an extent from its old location and writes the extent to its new location; when this copy is complete, the virtual volume migrator 220 updates its records to indicate the new location of the virtual volume's 115 extent.

If the virtual volume migrator 220 migrates the one or more extents to a functional drive associated with the same RAID group as that of the failed drive, the virtual volume migrator 220 migrates the one or more extents such that the extents are located at a position that is lower than the upper limit of the spare drive. If the virtual volume migrator 220 migrates the one or more extents to a functional drive that is not associated with the same RAID group as that of the failed drive and/or migrates the one or more extents to an externally attached storage system, the virtual volume migrator 220 migrates the one or more extents to any available location.

Following migration, the process passes to step 735.

Figure 7B:
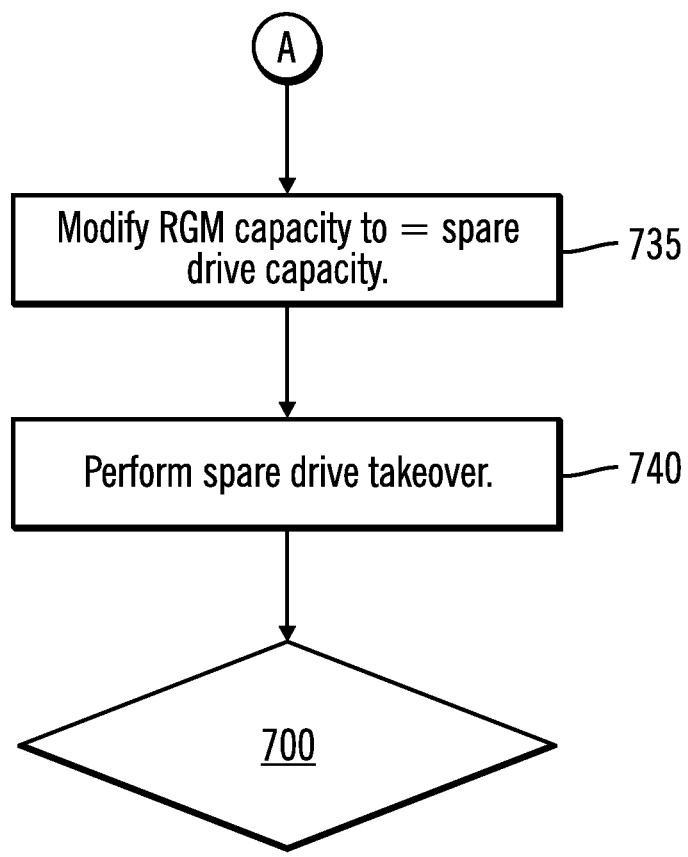

At step 720, if the virtual volume migrator 220 makes a determination that there are no one or more extents having a position higher than the upper limit of the spare drive, the process passes to step 735 in FIG. 7b.

With respect to FIG. 7b, at step 735, the RAID group member failure monitor 230 modifies the RAID group's member capacity to match the capacity of the spare drive (as redundancy cannot be provided for the remaining capacity) by assigning a value associated with the capacity of the spare drive to a memory location associated with the RAID group's member capacity.

At step 740, the RAID group manager 225 completes a hot spare takeover and the process passes to step 700.

A worked example of the process of the preferred embodiment will now be described with reference to the figures.

Figure 3:
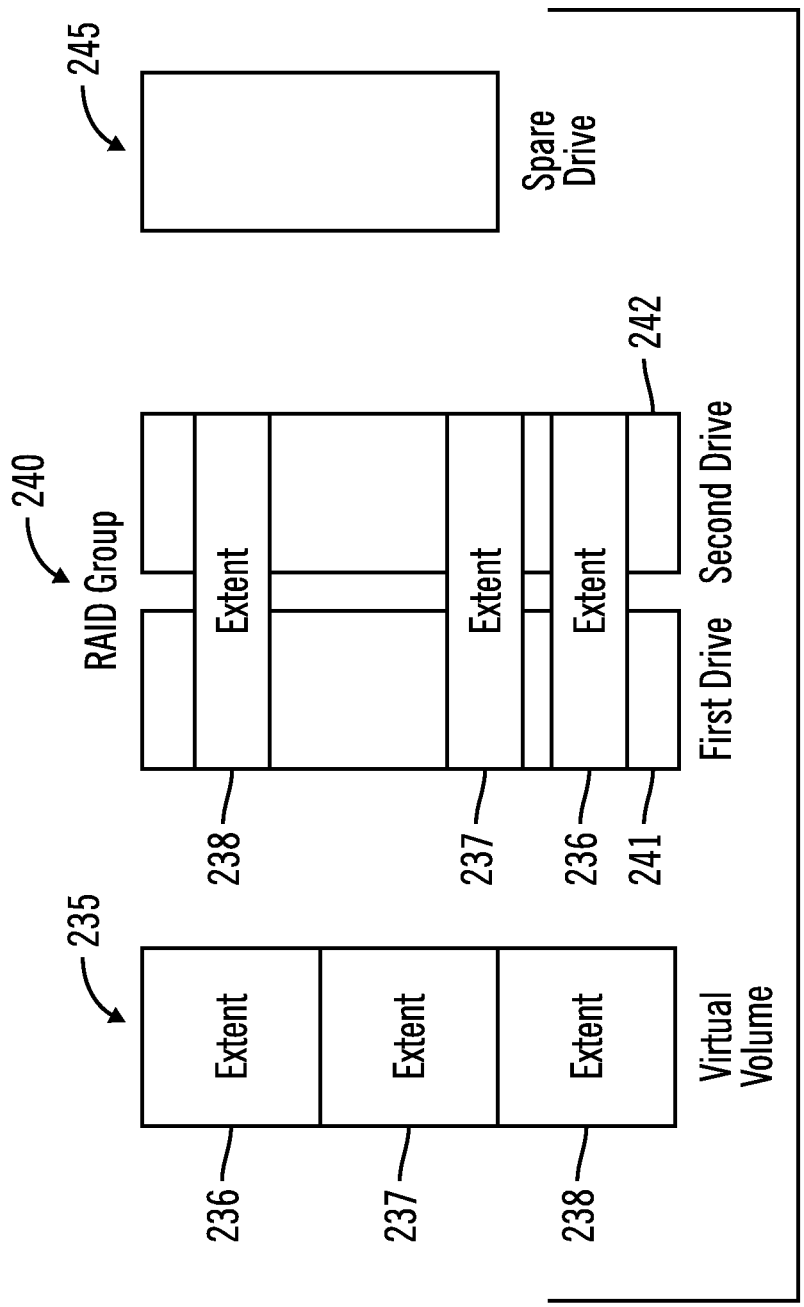
FIG. 3-6 depict a representation of a number of storage components of the system of FIG. 2.

With reference to FIG. 3, the system 200 comprises a virtual volume 210; a RAID group 240; and a spare drive 245. The virtual volume 210 comprises three 20 GB extents 236, 237 and 238 having an overall capacity of 60 GB. The RAID group 240 comprises a first drive 241 and a second drive 242 each having a 400 GB capacity. The RAID group 240 uses RAID-1 mirroring and thus, its overall capacity is 400 GB. The extents of the virtual volume 240 occupy space on the RAID group 240. The spare drive 245 has a capacity of 200 GB. In the example herein, there are no externally attached storage systems 250.

The virtual volume manager 215 stores a virtualization map for the virtual volume 210 as follows:

| Volume Position | RAID Group | RAID Group Position |
|---|---|---|
| 0 GB (extent 236) | 240 | 340 GB |
| 20 GB (extent 237) | 240 | 200 GB |
| 40 GB (extent 238) | 240 | 40 GB |

The map shows that the three extents 236, 237 and 238 making up the virtual volume 210 are each stored on the same RAID Group 240 at different positions within the RAID Group 240.

It should be noted that in the present example, the extents associated with the virtual volume 210 are not arranged in the same order on the RAID group 240 as the order associated with the virtual volume 210. Further, contrary to how the extents are represented on the virtual volume 235, the extents are not located adjacent to each other on the RAID group 240. From the example, it should be noted that the order and layout of extents on the RAID group 240 are arbitrary.

With reference to FIG. 7a, at step 700, the RAID group member failure monitor 230 makes a determination as to whether a member of a RAID group 240 has failed.

Figure 4:
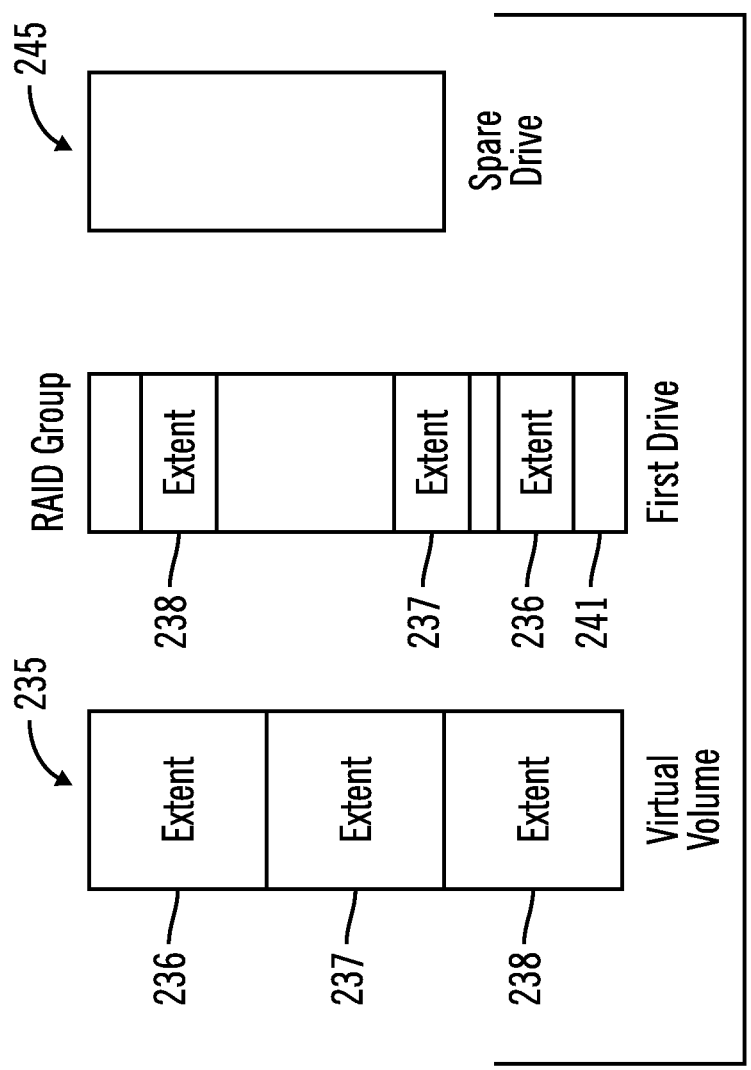

In the example herein, the second drive 242 fails—a representation is shown in FIG. 4, whereby only one physical copy of each of the extents 236, 237 and 238 reside in the RAID group 240, namely, on the first drive 241. In this state the virtual volume 210 is still intact but its extents have no more redundancy. If the first drive 241 fails, the virtual volume 210 will be lost. Without the described embodiments, if there are no spare drives 245 currently available to act as a replacement drive for the second drive 241, this risky situation may persist indefinitely.

At step 705, the RAID group member failure monitor 230 makes a determination as to whether any of the spare drives 245 has a capacity that is greater than or equal to the RAID group's member capacity. In the example herein, as the spare drive 245 has a capacity of 200 GB and the RAID group's member capacity is 400 GB, the process passes to step 715 where the RAID group member failure monitor 230 makes a determination as to whether a spare drive 245 has a capacity that is less than the RAID group's member capacity and if the RAID group's member capacity were to equal the lesser capacity of the spare drive 245, whether there are enough free extents in the system 200 to hold each of the extents currently allocated to the one or more virtual volumes 210.

Figure 5:
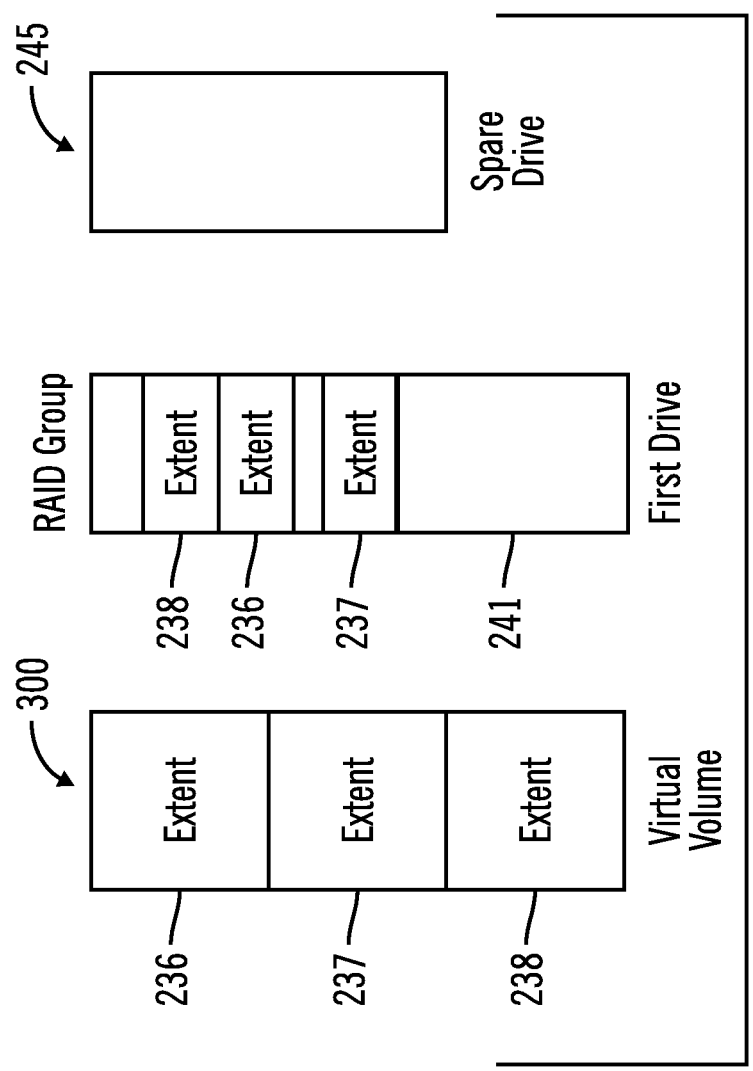

As there are enough free extents on the first drive 241 (namely, a functional drive associated with the same RAID group as that of the failed drive) to migrate extents 236 and 237, the process passes to step 720, where the virtual volume migrator 220 determines whether there are one or more extents occupying space associated with the remaining functional drives in the same RAID group as that of the failed drive that are at a position that is higher than the upper limit of the spare drive (which has a capacity of 200 GB). At step 720, it is determined by the virtual volume migrator 220 that the positions of the extents 236 and 237 associated with the first drive 241 are higher than the upper limit of the spare drive, and at step 725, the virtual volume migrator 220 migrates the one or more extents on the first drive 241. In the example herein, the virtual volume migrator 220 migrates extents 236 and 237 so that they are located within the first 200 GB of the first drive 241. A representation of the resulting first drive 241 is shown in FIG. 5, where the ordering of the extents following migration is not important.

Following the migration, the virtual volume manager 250 updates the virtualization map for the virtual volume 210 as follows:

| Volume Position | RAID Group | RAID Group Position |
|---|---|---|
| 0 GB (extent 236) | 240 | 60 GB |
| 20 GB (extent 237) | 240 | 100 GB |
| 40 GB (extent 238) | 240 | 40 GB |

The updated map shows extents 236 and 237 have been migrated to a position such that they are located at a position that is lower than the upper limit of the corresponding spare drive 245.

Advantageously, described embodiment exploit virtualization knowledge to migrate used extents away from the part of a drive that cannot be protected by a small spare drive when migrating such extents to another drive associated with the same group as a failed drive. Advantageously, described embodiments can also migrate such extents to drives associated with different groups and/or to externally attached storage systems.

At step 735, the RAID group member failure monitor 230 modifies the RAID group's member capacity to match the capacity of the spare drive (that is, the RAID group's member capacity of 400 GB is modified to equal 200 GB).

Figure 6:
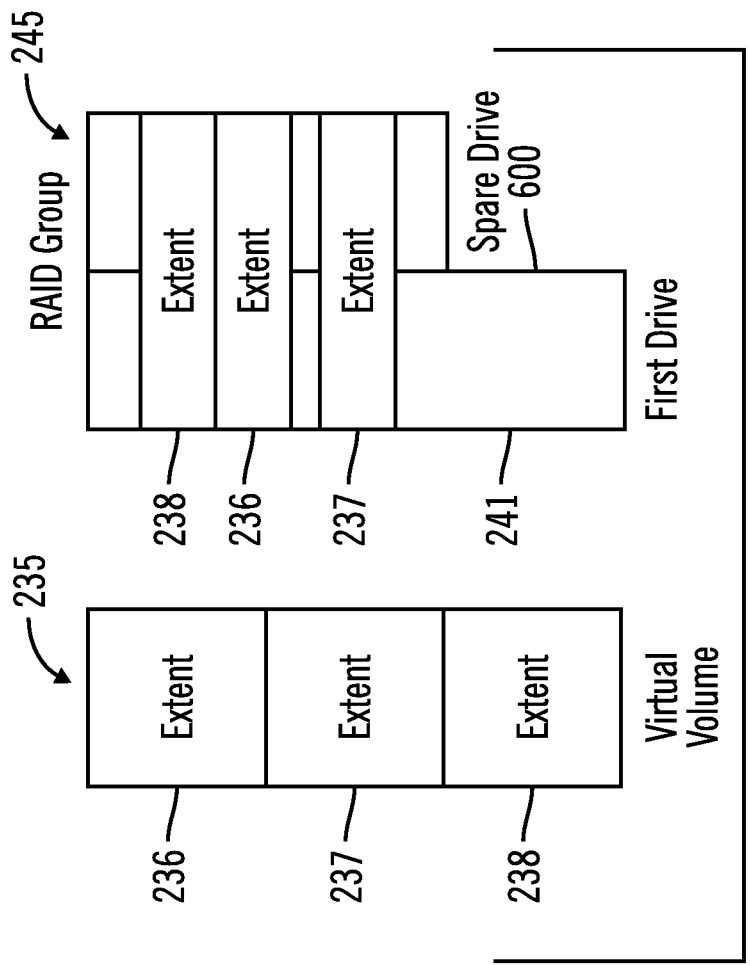

At step 740, a hot spare takeover process is completed by using the spare drive 245 in replacement of the second drive 242 and copying the data from the first drive 241 to the spare drive 245. This results in the system 200 being redundant again as there two physical copies of each virtual volume extent now exist. The resulting system is shown in FIG. 6 whereby 600 represents space on the first drive 241 that is temporarily not available for use—the effective capacity of the first drive 241 is diminished until a larger drive can be installed, at which point such larger drive is exchanged with the spare drive 245 so that redundancy can be provided for the further 200 GB of the first drive's 241 capacity.

With reference to the above example and step 715, it should be noted that there are enough free extents on the first drive 241 to migrate extents 236 and 237 away from the "dead zone" 600. In another example, if the entire capacity of the first drive 241 was being used and if the RAID group member failure monitor 230 determines that there are not enough free extents on the system's 200 other RAID groups 240 and/or externally attached storage systems 250 to store the extents that need to be migrated, the system 200 requires an adequately sized spare drive to store the migrated extents.

Advantageously, described embodiments provide a technique for allowing smaller hot spare drives to be used to restore redundancy to customer data in an array of larger drives in conjunction with a virtualization function. The virtualization function is used to move customer data away from the portion of a drive that cannot be protected by the smaller drive when migrating such extents to another drive associated with the same group as a failed drive. Advantageously, the described embodiments can also migrate such extents to drives associated with different groups and/or to externally attached storage systems. One advantage offered by the preferred embodiment is that wider spare coverage can be offered and the system can maintain redundancy under more failure scenarios. Further, fewer "larger" drives are required as spare drives, saving significant costs.

What is claimed is:

1. A system managing access to data stored in one or more storage devices comprising:
   a processor comprising a programmable data processing apparatus; and
   a non-transitory computer readable storage medium including code executable by the processor for performing operations, the operations comprising:
   in response to detecting a failure of a first storage device in a storage group having a plurality of extents in both the first storage device and a second storage device to provide redundancy, determining whether a spare storage device has a storage capacity less than that of the extents of the storage group, wherein each of the first storage device and the second storage device have at least the storage capacity of the storage group that exceeds the storage capacity of the spare storage device;
   moving one of the extents in a storage location in the second storage device having a position higher than an upper limit of the spare storage device to a new storage location in the second storage device that is within the upper limit in the spare storage device in response to determining that the spare storage device has the storage capacity less than the extents of the storage group; and
   incorporating the spare storage device into the storage group to provide redundant storage for the storage group, wherein the extents in the storage group are copied to the spare storage device.

2. The system of claim 1, wherein the operations further comprise:
   indicating that the storage group has a storage capacity of the spare storage device incorporated into the storage group.

3. The system of claim 1, wherein the moving of one of the extents is performed for each of the extents in a storage location beyond the position of the upper limit of the spare storage device.

4. The system of claim 1, further comprising:
   maintaining a virtualization map comprising data associated with: a position of an extent associated with a virtual volume; an associated identifier of at least one of: a RAID group and of an externally attached storage system; and a position of the extent on a corresponding at least one of: the RAID group and of the externally attached storage system.

5. The system of claim 1, further comprising:
   maintaining a virtualization map comprising data associated with: a position of an extent associated with a virtual volume; an associated identifier of at least one of: a RAID group and of an externally attached storage system; and a position of the extent on a corresponding at least one of: the RAID group and of the externally attached storage system.

6. A system managing access to data stored in one or more storage devices comprising:
   a processor comprising a programmable data processing apparatus; and
   a non-transitory computer readable storage medium including code executable by the processor for performing operations, the operations comprising:
   in response to detecting a failure of a first storage device in a storage group, wherein the storage group stores a plurality of extents in both the first storage device and a second storage device to provide redundancy, determining whether a spare storage device has a storage capacity less than that of the extents of the storage group;
   moving one of the extents in a storage location in the second storage device having a position higher than an upper a limit of the spare storage device to a new storage location in response to determining that the spare storage device has the storage capacity less than the extents of the storage group; and
   incorporating the spare storage device into the storage group to provide redundant storage for the storage group in response to determining that the spare storage device has a capacity equal to or greater than the storage group, wherein the extents in the storage group are copied to the spare storage device.

7. The system of claim 6, wherein the new storage location to which the extent is moved is included in the second storage device at a position before the upper limit of the spare storage device.

8. A computer program product comprising a computer readable storage medium having code executeable by a processor for managing access to data stored in one or more storage devices and perform operations, the operations comprising:

in response to detecting a failure of a first storage device in a storage group having a plurality of extents in both the first storage device and a second storage device to provide redundancy, determining whether a spare storage device has a storage capacity less than that of the extents of the storage group, wherein each of the first storage device and the second storage device have at least the storage capacity of the storage group that exceeds the storage capacity of the spare storage device;

moving one of the extents in a storage location in the second storage device having a position higher than an upper limit of the spare storage device to a new storage location in the second storage device that is within the upper limit in the spare storage device in response to determining that the spare storage device has the storage capacity less than the extents of the storage group; and incorporating the spare storage device into the storage group to provide redundant storage for the storage group, wherein the extents in the storage group are copied to the spare storage device.

9. The computer program product of claim 8, wherein the operations further comprise:

indicating that the storage group has a storage capacity of the spare storage device incorporated into the storage group.

10. The computer program product of claim 8, wherein the moving of one of the extents is performed for each of the extents in a storage location beyond the position of the upper limit of the spare storage device.

11. The computer program product of claim 8, wherein the spare storage device is further incorporated into the storage group to provide redundant storage in response to determining that the spare storage device has a capacity equal to or greater than the storage group.

12. The computer program product of claim 8, wherein the moving of one of the extents is performed for each of the extents in a storage location beyond the position of the upper limit of the spare storage device.

13. A method for managing access to data stored in one or more storage devices comprising:

in response to detecting a failure of a first storage device in a storage group having a plurality of extents in both the first storage device and a second storage device to provide redundancy, determining whether a spare storage device has a storage capacity less than that of the extents of the storage group, wherein each of the first storage device and the second storage device have at least the storage capacity of the storage group that exceeds the storage capacity of the spare storage device;

moving one of the extents in a storage location in the second storage device having a position higher than an upper limit of the spare storage device to a new storage location in the second storage device that is within the upper limit in the spare storage device in response to determining that the spare storage device has the storage capacity less than the extents of the storage group; and incorporating the spare storage device into the storage group to provide redundant storage for the storage group, wherein the extents in the storage group are copied to the spare storage device.

14. The method of claim 13, further comprising:

indicating that the storage group has a storage capacity of the spare storage device incorporated into the storage group.

15. The method of claim 13, further comprising:

maintaining a virtualization map comprising data associated with: a position of an extent associated with a virtual volume; an associated identifier of at least one of: a RAID group and of an externally attached storage system; and a position of the extent on a corresponding at least one of: the RAID group and of the externally attached storage system.

16. A method for managing access to data stored in one or more storage devices comprising:

in response to detecting a failure of a first storage device in a storage group, wherein the storage group stores a plurality of extents in both the first storage device and a second storage device to provide redundancy, determining whether a spare storage device has a storage capacity less than that of the extents of the storage group;

moving one of the extents in a storage location in the second storage device having a position higher than an upper limit of the spare storage device to a new storage location in response to determining that the spare storage device has the storage capacity less than the extents of the storage group; and incorporating the spare storage device into the storage group to provide redundant storage for the storage group in response to determining that the spare storage device has a capacity equal to or greater than the storage group, wherein the extents in the storage group are copied to the spare storage device.

17. The method of claim 16, wherein the new storage location to which the extent is moved is included in the second storage device at a position before the upper limit of the spare storage device.

* * * * *